July 29, 1941.  K. F. GALLIMORE  2,251,016
CLAMPING MECHANISM
Filed Feb. 26, 1940   2 Sheets-Sheet 1
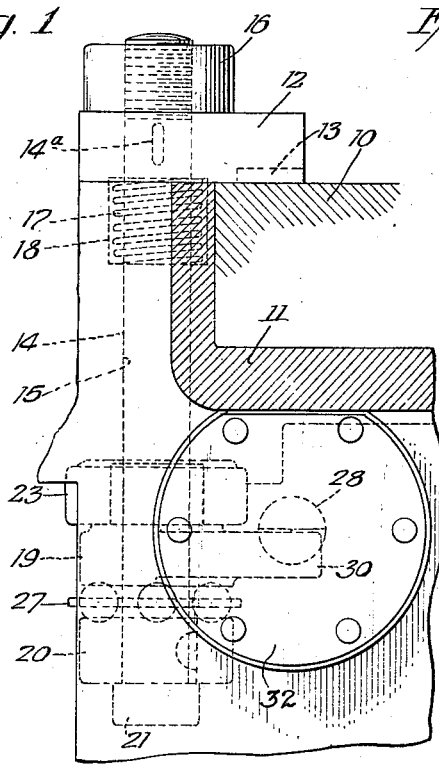
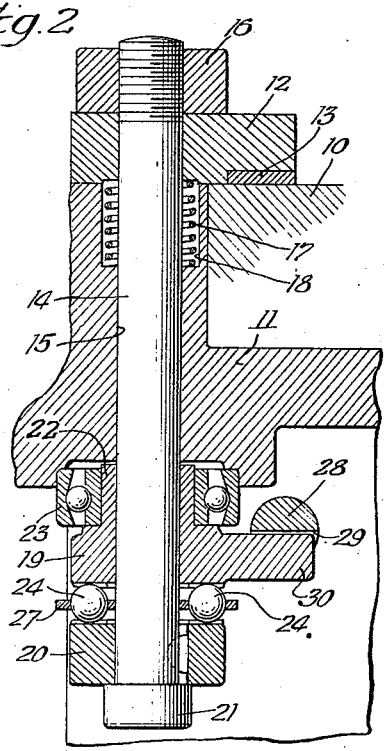
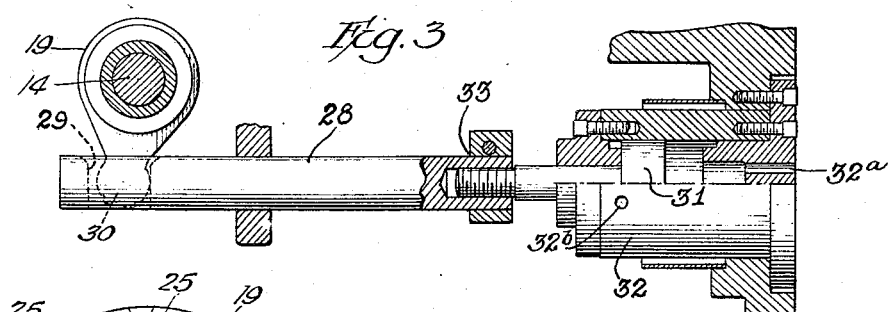
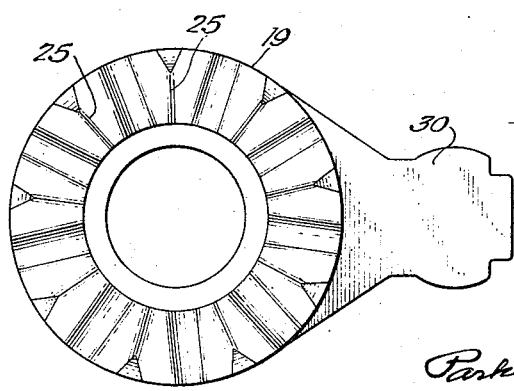
Inventor:
Keith F. Gallimore
BY
Parker, Carlson, Pitzner & Hubbard
Attorneys July 29, 1941.　　K. F. GALLIMORE　　2,251,016
CLAMPING MECHANISM
Filed Feb. 26, 1940　　2 Sheets-Sheet 2

Inventor:
Keith F. Gallimore

Patented July 29, 1941

2,251,016

UNITED STATES PATENT OFFICE 2,251,016

CLAMPING MECHANISM

Keith F. Gallimore, Fond du Lac, Wis., assignor to Giddings & Lewis Machine Tool Co., Fond du Lac, Wis., a corporation of Wisconsin Application February 26, 1940, Serial No. 320,854

8 Claims. (Cl. 29—26)

The present invention relates to improvements in clamping mechanisms, devices embodying the present invention being particularly adapted for clamping in place at any desired point in its path of travel a movable element of a machine tool.

The general aim of the present invention is to provide a novel mechanism capable of rigidly clamping in place a movable member such as a machine tool element and of such character that it may be actuated smoothly and easily into and out of clamped position despite the very heavy clamping forces involved.

A more specific object is to provide a clamping mechanism comprising a simple, but extremely rugged and powerful operating means in the form of a pair of opposed circular and coaxial cam tracks having radially extending and circumferentially spaced projections on them and receiving a series of balls therebetween, the cam tracks being arranged to be forced apart into clamp-setting position by the wedging of the balls between the high points on the cams as the latter are oscillated relative to each other, the smooth running action of the balls on the cam tracks rendering the device easy to manipulate and yet the powerful wedging action serving to provide a strong clamping force.

A further object is to provide a clamping mechanism of the type indicated which is characterized particularly by simplicity of form and low cost combined with extreme ruggedness and strength of construction.

Further objects and advantages of the invention will become apparent as the following description proceeds, taken in connection with the accompanying drawings, in which:

Figure 1 is a plan view of a clamping mechanism embodying the invention.

Fig. 2 is a longitudinal sectional view of the device of Fig. 1.

Fig. 3 is a side elevation, on reduced scale, of an actuating mechanism for the device of Fig. 1.

Fig. 4 is an enlarged face view of a cam collar included in the clamping mechanism.

Figure 5:
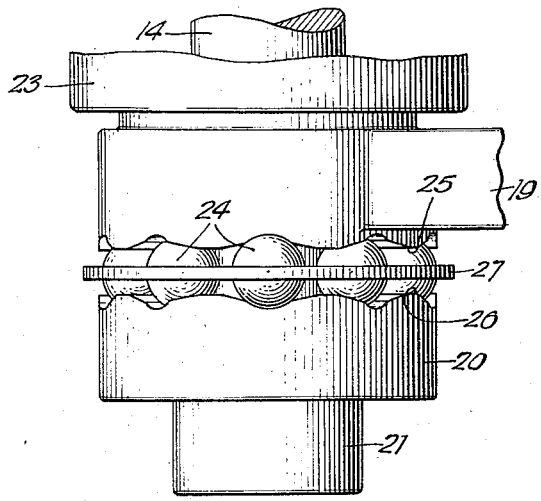
Figs. 5 and 6 are enlarged stop-motion side views of a portion of the clamping mechanism showing the parts respectively in their released and clamping positions.

For purposes of exemplification, the invention has been shown herein in one embodiment (Figs. 1 to 5) in the form of a mechanism for clamping in position on a rail or guide, shown in transverse section at 10, a movable machine tool element, a portion of which is indicated at 11, and which is slidable along the rail. The clamping mechanism is carried by the movable element 11 and housed within it. In brief, the mechanism includes a generally rectangular clamping shoe 12 with a wear plate 13 on its inner face, which is drawn into engagement with the opposed face of the rail 10 to clamp the element 11 in position.

To support the shoe 12 for movement into and out of clamping position, it is fixed by a key 14ª on the outer end of a clamp shaft 14, which is slidable endwise in a bore 15 fashioned in the machine tool element 11 (Fig. 1). An adjustment nut 16 threaded on the end of the shaft limits the outward movement of the clamping shoe 12. On the opposite or inner side of the shoe is located a helical compression spring 17 encircling the shaft and interposed between the shoe and the bottom of a counterbore 18 (Fig. 2). This spring serves to urge the shoe 12 yieldably into its unclamped position.

Axial shifting of the clamp shaft 14 inward to draw the shoe 12 into clamped position is accomplished by cam means comprising in the present instance a pair of cam collars 19 and 20 encircling the inner end of the shaft. Of the two collars, the inner one 20 is keyed to the shaft 14 (Fig. 2) and abuts at its outer side against a head 21 fashioned on the shaft. The other collar 19 is freely rotatable on the clamp shaft and has an integral hub 22 of reduced diameter, which is journaled in a combination radial and end thrust anti-friction bearing 23. In general, suitable cam tracks are provided on the opposed faces of these collars 19 and 20, with a series of anti-friction rolling members shown as balls 24 between them, the collars being forced axially apart upon rotation of the outer collar 19 due to the wedging of the balls between the high portions of the cams. In this way, the inner collar 20 is thrust inward (as viewed in Fig. 2) and carries with it the clamp shaft 14, thus drawing the shoe 12 into clamped position. During such operation the shaft 14 and its attached parts, including the shoe 12 and inner cam collar 20, are restrained against rotation by suitable abutments (not shown) engaging the sides of the shoe.

Figure 6:
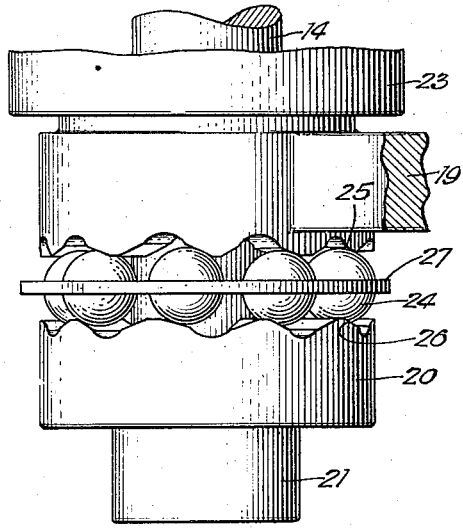

In the present instance the cam tracks on the opposed faces of the collars 19 and 20 are substantially identical and are fashioned in the form of radially extending teeth 25 and 26 (see Figs. 4, 5 and 6). These teeth are preferably quite shallow, their side faces having in the present exemplary construction a slope of about four degrees. The bottoms of the interdental spaces are rounded (see Fig. 5) to the curvature of the balls 24 so as to embrace the same closely and permit a minimum clearance between the cam collars when the mechanism is in its unclamped position (Fig. 5). This series of balls is in turn held in place by a sheet metal cage 27 of circular form, apertured at suitably spaced points to receive the balls. Both the cam tracks and the balls are preferably fashioned of hardened steel in order to withstand without distortion, scoring or galling, the heavy compressive forces applied to them.

To actuate the clamping mechanism a hydraulic actuator (Fig. 3) has been provided. Such a hydraulic actuator can be readily controlled from a point either remote from or adjacent to the clamping mechanism itself by means of a suitable control system (not shown) of any well known form. In the instant actuator arrangement an axially shiftable actuator rod 28 is arranged for endwise sliding movement within the machine tool element 11. This rod is notched as indicated at 29 (see also Fig. 2) to receive the end of an integral rocker arm 30 formed on the rotatably mounted cam collar 19. Accordingly, an endwise shifting of the rod 28 oscillates the cam collar 19 for actuation of the clamping mechanism. To effect such movement of the rod 28 it is rigidly coupled as indicated at 33 to a piston 31 slidable within a hydraulic cylinder 32. Pressure fluid may be supplied to the left face of the piston and exhausted from the right face to move the rod 28 to the right for its clamping movement, and similarly pressure fluid may be supplied to the opposite or right face and exhausted from the left face to move the rod in the other direction for unclamping. Suitably controlled pressure fluid conduits (not shown) are provided in the conventional manner for this purpose, communicating with the spaces at the opposite sides of the piston through ports 32ª and 32ᵇ.

In the operation of the clamping mechanism described above, assuming that it is in its unclamped position, the roots of the cam teeth 25, 26 will be in registry with the balls 24 between them (Fig. 5). In such case there is a minimum displacement between the cam collars 19, 20 and the compression spring 17 is thus free to force the clamp shoe 12 outwardly away from the rail 10 sufficiently to release the element 11 for movement along the rail. To actuate the parts into clamping position, pressure fluid is supplied to the left face of the piston 31 through port 32ᵇ and exhausted through port 32ª (Fig. 3) whereupon the actuator rod 28 is shifted axially to the right and oscillates the outer cam collar 19 through a distance equal to a little less than half the circumferential width of one of the cam teeth. This rotation of the cam collar 19 causes the cam teeth 25 to ride up on the balls 24 and also roll them up the faces of the opposed teeth 26 so that the balls are wedged in position between the teeth in a position just short of their high points (Fig. 6). Consequently, the cam collars 19 and 20 are forced apart or, in other words, the inner cam collar 20 forced inward, thereby also pulling the clamp shaft 14 inward. This draws the clamp shoe 12 tight against the rail 10 with a very heavy clamping force. To release the clamp it is, of course, simply necessary to move the actuator shaft 28 to the left to its initial position, whereupon the cam collars are returned to the position of Fig. 5, freeing the compression spring 17 to thrust the clamp shaft 14 outward and release the shoe 12. By using such smoothly running roller members as the balls 24, a correspondingly smooth operation of the device is assured.

Figure 8:
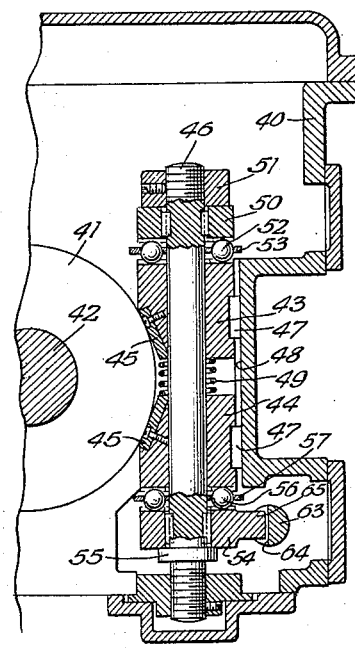
Fig. 8 is a vertical sectional view along the line 8—8 in Fig. 7.
Figure 7:
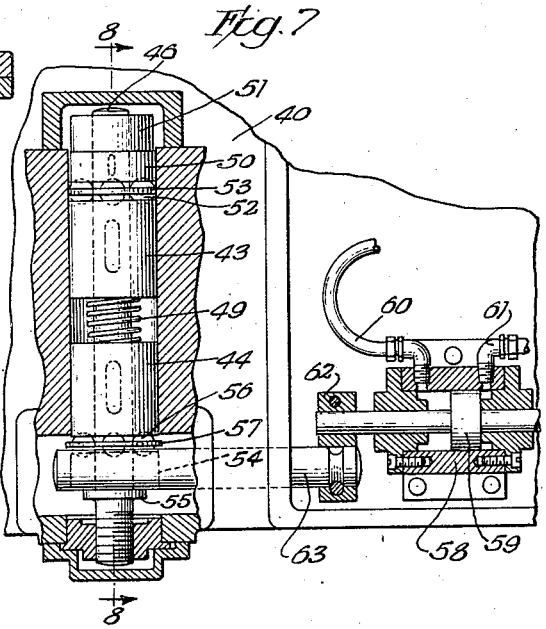
Fig. 7 is a plan view of a modified form of clamping mechanism embodying the invention, the mechanism and its associated actuator being shown partially in section.

A modified form of clamping mechanism embodying the invention has been shown in Figs. 7 and 8. This mechanism has been shown as mounted within a casing 40 of, for example, a ram housing of a machine tool and is adapted to clamp against axial movement a cylindrical ram or sleeve 41 having journaled in it a tool spindle 42. In brief, the clamping mechanism includes a pair of opposed clamp shoes shown (Fig. 8) in the form of cylindrical clamp collars 43 and 44 with angularly disposed rectangular wear plates 45 positioned to engage and grip the ram 41 when the clamp collars are moved toward each other and to release the same when the collars are moved apart.

In general, the clamping mechanism is like that of Figs. 1 to 5 heretofore described but the relative motions of various parts are altered to accommodate the double shoe arrangement. In particular, a clamp shaft is used which is restrained against endwise movement but free to rotate instead of the reverse arrangement of the first embodiment in which the shaft 14 is free for endwise movement but restrained against rotation. As before, a pair of opposed cam collars are used with one movable axially of the shaft and the other restrained against such movement, and with one collar oscillatable with respect to the shaft axis and the other restrained against movement about such axis. In the modified construction, however, it is the collar which is oscillatable about the shaft axis which is restrained against movement axially of the shaft rather than as in Figs. 1 to 5, in which the collar 19 is oscillatable about the shaft axis and also movable relative to it in an axial direction.

In the particular arrangement shown in Figs. 7 and 8 the clamp collars 43 and 44 are slidably mounted on a vertical clamp shaft 46 and are held against rotation by spline keys 47 received in a complemental groove 48 in the housing 40. A compression spring 49 interposed between the collars yieldably urges them apart into their released or unclamped position.

To actuate the clamp collars 43, 44 into clamped position two cam and ball arrangements of the same general form as that heretofore described are utilized. The cam and ball arrangement which moves the upper shoe 43 is located at the top of the clamp shaft 46 and includes a cam collar 50 keyed fixedly in position on the clamp shaft, its endwise movement being limited by an adjustment nut 51. The opposed faces of this cam collar 50 and the upper clamp collar 43 are provided with annular cam tracks in the form of shallow radial teeth substantially identical with those for the cam collars 19 and 20 heretofore described. Between these opposed cam faces is located a series of balls 52 held in position by a cage 53. Similarly, at the lower end of the clamp shaft 46 a cam collar 54 is keyed to the shaft and held against endwise displacement on it by an integral collar 55 on the shaft. The opposed faces of the cam collar 54 and clamp collar 44 are also provided with circular cam tracks of the form previously described. Between these cam tracks is located a series of balls 56 held by a cage 57.

With the arrangement described oscillation of the clamp shaft 46 moves the cam collars 50 and 54, which are keyed to it, so that the teeth on these cam collars are moved out of registry with the opposed cam teeth on the clamp collars 43, 44, thereby wedging the series of balls 52 and 56 between the high portions of the opposed cam tracks so that the clamp collars 43 and 44 are thrust inward toward each other into clamping position. To release the clamp it is, of course, simply necessary to oscillate the shaft 46 back to its initial position, whereupon the balls ride into the registering interdental spaces of the cam tracks and the spring 49 forces the collars 43 and 44 apart.

A hydraulic actuator is also provided for the modified clamping mechanism of Figs. 7 and 8. In particular, a hydraulic cylinder 58 (Fig. 7) is mounted on the casing 40 and has in it an axially slidable piston 59 moved by means of pressure fluid alternatively supplied and exhausted through conduits 60 and 61. The outer end of the piston is fastened by a rigid coupling 62 to an axially slidable rod 63, notched as indicated at 64 (Fig. 8) near its outer end, to receive the nose of an integral rocker arm 65 on the cam collar 54.

In the operation of the mechanism of Figs. 7 and 8, pressure fluid is supplied through the conduit 61 and exhausted through the conduit 60 to move the mechanism into clamped position. Such supply of pressure fluid moves the piston 59 to the left so that the cam collar 54 is correspondingly oscillated, carrying with it the clamp shaft 46 and upper collar 50. Thereupon the balls 52 and 56 are wedged between the high portions of the cam teeth, as heretofore described in connection with Figs. 5 and 6, so as to force the collars 43, 44 toward each other and bring the shoes 45 into tight engagement with the ram 41. Similarly, to release the clamp, pressure fluid is supplied through conduit 60 and exhausted through 61 to restore the piston 59 to its initial position shown in Fig. 7. This returns the shaft 46 and its attached collars 50 and 54 to their initial angular position in which the teeth on the two sets of collars register with the balls 52, 56 falling between the registering interdental spaces in the cam tracks. The freed collars 43 and 44 are thereupon thrust apart by the spring 49 to relieve the clamping pressure on the shoes 45.

I claim as my invention:

1. In a device of the type described the combination of a shaft restrained against movement in one direction and free for movement in another direction in which one of such two directions is longitudinal of the shaft axis and the other angular about it, a clamp shoe restrained against movement about the shaft axis but movable longitudinally of such axis, a pair of cam members presenting opposed cam tracks lying generally transverse of the shaft axis, a rolling member between said cam tracks and engaged thereby, one of said cam members being fixed against rotation about the shaft axis and the other being oscillatable about it, and one of said cam members being fixed against movement axially with respect to the shaft and the other being movable relative to the shaft in such direction.

2. In a clamping mechanism, the combination of a clamp shaft, a pair of cam members presenting opposed circular cam tracks encircling said shaft, one of said members being fixed against rotation about the shaft axis and the other being oscillatable about it, said shaft and one of said members being movable relative to each other axially of the shaft and the other member and said shaft being fixed against such relative movement, a series of balls located between said cam tracks, said cam tracks being substantially identical in form and presenting a series of shallow radially extending teeth with gently sloping sides terminating at their root ends in curved bottoms for the interdental spaces conforming to the ball curvature, means for oscillating one of said members relative to the other to move said teeth out of registry and thereby wedge the balls between them with a resultant displacement of said members axially of the shaft, and a clamp shoe movable in response to such displacement of said members.

3. In a device of the type described, the combination of a shaft supported for endwise movement and held against rotation, a clamping shoe movable in unison with said shaft, a first cam collar encircling said shaft and oscillatable about it, a combined radial and thrust anti-friction bearing supporting said first cam collar, a second cam collar rigid with said shaft and located in spaced relation to said first collar, said collars having cam tracks on their opposed portions, a rolling member received between said cam tracks, and means for oscillating said first collar to wedge said rolling member between the high portions of said cam tracks and thereby force the collars apart to draw the shaft axially into clamped position.

4. In a device of the type described, the combination of a shaft supported for endwise movement and held against rotation, a clamping shoe rigid with said shaft, a first cam collar encircling said shaft and oscillatable about it, a combined radial and thrust anti-friction bearing supporting said first cam collar, a second cam collar rigid with said shaft and arranged in spaced relation to said first collar, said collars each having a series of radially extending shallow cam teeth on their opposed faces, a series of balls located between said teeth, and means for oscillating said first collar to wedge said balls between said teeth and thereby force the collars apart to draw the shaft axially into clamped position.

5. In a device of the type described, the combination of a shaft supported for endwise movement and held against rotation, a clamping shoe on said shaft splined against rotation with respect to it, a helical compression spring encircling said shaft and bearing at one end against one face of said shoe and at the other end against a fixed abutment, an adjusting nut threaded on said shaft and bearing against the opposite side of said shoe, and means for drawing said shaft axially against the bias of said spring to move the shoe into clamping position, said last named means including a pair of cam members presenting opposed cam faces located generally transversely to the shaft axis, one of said cam members being fixed to said shaft and the other being slidable with respect to the shaft axis, and a rolling member disposed between and engaged by said cam surfaces.

6. In a clamping mechanism the combination of a clamp shaft mounted for oscillation and restrained against endwise movement, a pair of opposed clamp shoes arranged for movement toward and away from each other along a path paralleling a shaft axis, two pairs of cam members arranged with one member in each pair operatively connected to one of said shoes and movable axially along the shaft, the other member of each pair being rotatable about the shaft axis and restrained against movement axially of it, said cam members in each pair having opposed cam tracks arranged generally transversely to the shaft axis, rolling members located between each of the opposed pairs of cam tracks, and means for oscillating said other members in each pair to actuate the clamping mechanism.

7. In a clamping mechanism the combination of a clamp shaft mounted for oscillation and restrained against endwise movement, two pairs of cam collars encircling said shaft and arranged with the outer collar in each pair fixed to said shaft and with the inner collar in each pair slidable axially of the shaft but restrained against rotational movement with respect to it, a clamp shoe rigid with the inner collar of each pair, a helical compression spring encircling said shaft, and arranged with its ends abutting against the opposed faces of the inner collar in each pair to yieldably urge the same away from each other, said collars in each pair having opposed circular cam tracks thereon, a series of balls located between each of the opposed pairs of cam tracks, and means for oscillating said shaft and the outer collars rigid therewith to wedge said balls between the high portions of said cam tracks and thereby force the inner collar of each pair axially inward toward the other.

8. A clamping mechanism comprising, in combination, a clamping member movable between clamping and unclamping positions, means yieldably urging said clamping member to its unclamped position, means including a pair of separable members operative upon separation thereof relative to each other for forcing said clamping member toward its clamping position, and means for separating said separable members including coaxially disposed generally circular cam tracks on their opposed faces with a plurality of rolling members therebetween as well as means for effecting relative rotation of said separable members about the axis of said tracks, at least one of said cam tracks having high points thereon, whereby upon the relative rotation of said separable members said rolling members will roll smoothly, and without substantial sliding friction, up toward the noses of said high points and thus wedge said separable members apart to force said clamping member toward its clamping position.

KEITH F. GALLIMORE.